United States Patent
Fonk et al.

(10) Patent No.: US 12,345,574 B2
(45) Date of Patent: Jul. 1, 2025

(54) TEMPERATURE INDICATOR

(71) Applicant: ShockWatch, Inc., Dallas, TX (US)

(72) Inventors: Anthony N. Fonk, Austin, TX (US); Johannes A. van Niekerk, Dallas, TX (US); Phillip W. Barth, Portola Valley, CA (US)

(73) Assignee: SHOCKWATCH, INC., Dallas, TX (US)

( * ) Notice: Subject to any disclaimer, the term of this patent is extended or adjusted under 35 U.S.C. 154(b) by 980 days.

(21) Appl. No.: 17/443,274

(22) Filed: Jul. 23, 2021

(65) Prior Publication Data

US 2022/0026283 A1 Jan. 27, 2022

Related U.S. Application Data

(60) Provisional application No. 63/056,577, filed on Jul. 25, 2020.

(51) Int. Cl.
*G01K 5/48* (2006.01)
*G01K 1/024* (2021.01)
(Continued)

(52) U.S. Cl.
CPC ............ *G01K 5/486* (2013.01); *G01K 1/024* (2013.01); *G01K 5/54* (2013.01); *G06K 7/10366* (2013.01)

(58) Field of Classification Search
CPC .......... G01K 5/486; G01K 1/024; G01K 5/54; G01K 3/04; G01K 5/72; G06K 7/10366;
(Continued)

(56) References Cited

U.S. PATENT DOCUMENTS 3,230,358 A   1/1966   Davis et al.
3,499,323 A   3/1970   Sturges
(Continued)

FOREIGN PATENT DOCUMENTS

CN   107817058   3/2018
WO   9909637     2/1999
(Continued)

OTHER PUBLICATIONS

Rfmicron, Inc.; RFM3200 Wireless Flexible Temperature Sensor Brochure; Feb. 25, 2020.
(Continued)

*Primary Examiner* — Kristina M Deherrera
*Assistant Examiner* — Tania Courson
(74) *Attorney, Agent, or Firm* — Dority & Manning, P.A.

(57) ABSTRACT

A temperature indicator includes a micro-sensor having a sensing element with a first layer coupled to a second layer where the first and second layers have different coefficients of expansion. The sensing element is configured to move from a first position to a second position in response to exposure to a temperature event and has detection circuitry configured to change from a first state to a second state in response to movement of the sensing element to the second position. The detection circuitry is prevented from returning to the first state in response to changing to the second state. An RFID module is coupled to the detection circuitry and is configured to output a value indicating that the sensing element is in the second position. An activator element is configured to maintain the sensor element in the first position until removal of the activator element from the micro-sensor.

6 Claims, 5 Drawing Sheets

(51) Int. Cl.
 *G01K 5/54* (2006.01)
 *G06K 7/10* (2006.01)
(58) Field of Classification Search
 CPC ......... G06K 19/0717; G06K 19/07749; G06K 19/07758
 See application file for complete search history.

(56) References Cited

U.S. PATENT DOCUMENTS

| | | | |
|---|---|---|---|
| 3,961,323 A | 6/1976 | Hartkorn | |
| 4,462,023 A | 7/1984 | Nielsen et al. | |
| 4,496,829 A | 1/1985 | Black et al. | |
| 4,575,803 A | 3/1986 | Moore | |
| 4,604,871 A | 8/1986 | Chiu et al. | |
| 4,621,502 A | 11/1986 | Ibrahim et al. | |
| 4,685,061 A | 8/1987 | Whitaker | |
| 4,750,197 A | 6/1988 | Denekamp et al. | |
| 4,762,426 A | 8/1988 | Foss | |
| 4,972,099 A | 11/1990 | Amanao et al. | |
| 5,058,856 A * | 10/1991 | Gordon | F15C 5/00 251/11 |
| 5,244,146 A | 9/1993 | Jefferson et al. | |
| 5,254,992 A | 10/1993 | Keen et al. | |
| 5,262,758 A | 11/1993 | Nam et al. | |
| 5,313,848 A | 5/1994 | Santin et al. | |
| 5,403,093 A | 4/1995 | Flynn et al. | |
| 5,424,720 A | 6/1995 | Kirkpatrick | |
| 5,442,669 A | 8/1995 | Medin | |
| 5,452,335 A | 9/1995 | Slater et al. | |
| 5,528,228 A | 6/1996 | Wilk | |
| 5,798,694 A | 8/1998 | Reber et al. | |
| 5,835,012 A | 11/1998 | Wilk | |
| 5,844,862 A | 12/1998 | Cocatre-Zilgien | |
| 5,867,809 A | 2/1999 | Soga et al. | |
| RE36,200 E | 4/1999 | Berrian et al. | |
| 5,917,226 A | 6/1999 | Chan et al. | |
| 5,917,416 A | 6/1999 | Read | |
| 5,936,523 A | 8/1999 | West | |
| 5,966,066 A * | 10/1999 | Mehregany | G01P 15/0802 337/14 |
| 6,034,607 A | 3/2000 | Vidaillac | |
| 6,046,674 A | 4/2000 | Irwin et al. | |
| 6,046,678 A | 4/2000 | Wilk | |
| 6,185,513 B1 | 2/2001 | Plettner et al. | |
| 6,275,779 B1 | 8/2001 | Ponie et al. | |
| 6,286,992 B1 | 9/2001 | Kyrtsos | |
| 6,320,512 B1 | 11/2001 | Nicholson et al. | |
| 6,326,892 B1 | 12/2001 | De La Forterie | |
| 6,411,916 B1 | 6/2002 | Pellerin | |
| 6,424,930 B1 | 7/2002 | Wood | |
| 6,438,502 B1 | 8/2002 | Awtrey et al. | |
| 6,501,390 B1 | 12/2002 | Chainer et al. | |
| 6,555,789 B2 | 4/2003 | Owens et al. | |
| 6,570,508 B1 | 5/2003 | Kvenvold | |
| 6,643,608 B1 | 11/2003 | Hershey et al. | |
| 6,706,981 B1 * | 3/2004 | Ma | H01P 1/127 200/267 |
| 6,712,276 B1 | 3/2004 | Abali et al. | |
| 6,753,830 B2 | 6/2004 | Gelbman | |
| 6,771,177 B2 | 8/2004 | Alderman | |
| 6,806,808 B1 | 10/2004 | Watters et al. | |
| 6,811,305 B2 | 11/2004 | Laycock | |
| 6,847,912 B2 | 1/2005 | Forster | |
| 6,850,861 B1 | 2/2005 | Faiola et al. | |
| 6,865,516 B1 | 3/2005 | Richardson | |
| 6,889,165 B2 | 5/2005 | Lind et al. | |
| 6,924,781 B1 | 8/2005 | Gelbman | |
| 6,950,028 B2 | 9/2005 | Zweig | |
| 6,970,100 B2 | 11/2005 | Lovegreen et al. | |
| 6,985,408 B2 | 1/2006 | Quine | |
| 7,004,621 B2 | 2/2006 | Roberts et al. | |
| 7,057,495 B2 | 6/2006 | Debord et al. | |
| 7,081,811 B2 | 7/2006 | Johnston et al. | |
| 7,102,526 B2 | 9/2006 | Zweig | |
| 7,140,768 B2 | 11/2006 | Prabhakar | |
| 7,142,110 B2 | 11/2006 | Schmidtberg et al. | |
| 7,165,015 B2 | 1/2007 | Roberts | |
| 7,225,107 B2 | 5/2007 | Buxton et al. | |
| 7,250,858 B2 | 7/2007 | Schmidtberg et al. | |
| 7,253,731 B2 | 8/2007 | Joao | |
| 7,266,988 B2 | 9/2007 | Kranz et al. | |
| 7,378,954 B2 | 5/2008 | Wendt | |
| 7,409,310 B1 | 8/2008 | Wade | |
| 7,417,417 B2 | 8/2008 | Williams et al. | |
| 7,455,225 B1 | 11/2008 | Hadfield et al. | |
| 7,482,920 B2 | 1/2009 | Joao | |
| 7,487,037 B2 | 2/2009 | Schmidtberg | |
| 7,495,400 B2 | 2/2009 | Testin | |
| 7,552,029 B2 | 6/2009 | Elwood et al. | |
| 7,680,622 B2 | 3/2010 | Dupuy et al. | |
| 7,721,590 B2 * | 5/2010 | Kolosov | G01F 23/2966 73/54.41 |
| 8,154,417 B2 | 4/2012 | Hauenstein et al. | |
| 8,558,707 B1 | 10/2013 | Kim | |
| 9,217,683 B2 * | 12/2015 | Branch | G01P 15/036 |
| 9,488,162 B2 * | 11/2016 | Toyoda | H10N 30/078 |
| 10,282,967 B2 * | 5/2019 | Law | G01K 1/024 |
| 11,645,489 B2 * | 5/2023 | Fonk | G06K 19/0717 340/870.16 |
| 11,994,434 B2 * | 5/2024 | Fonk | G01K 7/30 |
| 2004/0113783 A1 | 6/2004 | Yagesh | |
| 2005/0157774 A1 | 7/2005 | DiLuiso et al. | |
| 2005/0270709 A1 | 12/2005 | Piemmons et al. | |
| 2006/0152313 A1 | 7/2006 | Zmood | |
| 2007/0008119 A1 | 1/2007 | Pohle et al. | |
| 2007/0024410 A1 * | 2/2007 | Yazdi | G01K 1/024 338/13 |
| 2007/0056369 A1 | 3/2007 | Griffin et al. | |
| 2007/0243621 A1 | 10/2007 | Zweig | |
| 2008/0052044 A1 | 2/2008 | Shoenfeld | |
| 2008/0082043 A1 | 4/2008 | Janssen | |
| 2008/0120188 A1 | 5/2008 | Mobley et al. | |
| 2008/0144697 A1 | 6/2008 | Stewart et al. | |
| 2008/0202258 A1 * | 8/2008 | Amin | H01H 35/14 73/862.625 |
| 2009/0320992 A1 * | 12/2009 | Xu | H10N 30/2042 204/192.15 |
| 2010/0244574 A1 | 9/2010 | Nishino et al. | |
| 2011/0107816 A1 * | 5/2011 | Barth | G01N 30/66 73/25.03 |
| 2011/0203347 A1 | 8/2011 | Hower et al. | |
| 2011/0254665 A1 * | 10/2011 | Lindsay | G06K 19/07345 340/10.5 |
| 2017/0102249 A1 * | 4/2017 | Yazdi | H01H 35/00 |
| 2019/0094257 A1 * | 3/2019 | Wardrup | G01P 15/038 |
| 2019/0172657 A1 | 6/2019 | Zhu et al. | |
| 2019/0236425 A1 * | 8/2019 | Fonk | G06K 19/0717 |
| 2019/0346314 A1 * | 11/2019 | Hainisch | G01K 5/72 |
| 2022/0180139 A1 * | 6/2022 | Fonk | G01K 1/024 |

FOREIGN PATENT DOCUMENTS

| | | |
|---|---|---|
| WO | 9935453 | 7/1999 |
| WO | 0150103 | 7/2001 |
| WO | 2019152645 | 8/2019 |

OTHER PUBLICATIONS

Sensitech, Inc.: Temptale Ultra Product Brochure; Apr. 25, 2019.
Spotsee; Warmmark Temperature Indicator Brochure; Oct. 2019.
International Search Report and Written Opinion; PCT Application No. PCT/US2021/070940; Nov. 9, 2021.
European Search Report Corresponding to EP21851263 on Aug. 30, 2024.

* cited by examiner

TEMPERATURE INDICATOR

BACKGROUND

During manufacturing, storage, or transit, many types of objects need to be monitored or tracked due to the temperature sensitivity or fragility of the objects. For example, some types of objects may be susceptible to damage if exposed to certain temperatures (e.g., food or pharmaceutical items). Thus, for quality control purposes and/or the general monitoring of transportation conditions, it is desirable to determine and/or verify the environmental conditions to which the object has been exposed.

BRIEF SUMMARY

According to one aspect of the present disclosure, a device and technique for temperature detection is disclosed. The temperature indicator includes a micro-sensor having a sensing element with a first layer coupled to a second layer where the first and second layers having different coefficients of expansion. The sensing element is configured to move from a first position to a second position in response to exposure to a temperature event. The micro-sensor also includes detection circuitry configured to change from a first state to a second state in response to movement of the sensing element from the first position to the second position. The detection circuitry is prevented from returning to the first state in response to changing to the second state. The indicator also includes a radio-frequency identification (RFID) module coupled to the detection circuitry where the RFID module is configured to output a value indicating that the sensing element is in the second position. The indicator further includes an activator element configured to maintain the sensor element in the first position until removal of the activator element from the micro-sensor.

According to another embodiment of the present disclosure, a temperature indicator includes a substrate having a communications module inlay configured to communicate an actuation status of the indicator, a micro-sensor communicatively coupled to the communications module inlay for detecting a temperature event where the micro-sensor has irreversible detection circuitry configured to detect the actuation status, and an activator element configured to maintain the micro-sensor in a non-reactive state until removal of the activator element from the micro-sensor.

According to yet another embodiment of the present disclosure, a temperature indicator includes a micro-sensor configured to activate in response to receipt by the micro-sensor of a temperature event. The micro-sensor includes detection circuitry configured to change from a first state to a second state in response to the activation of the micro-sensor and the detection circuitry is prevented from returning to the first state in response to the activation. The indicator also includes a radio-frequency identification (RFID) module coupled to the detection circuitry where the RFID module is configured to output a value indicating that the micro-sensor has been actuated. The indicator further includes an activator element configured to maintain the micro-sensor in a non-reactive state until removal of the activator element from the micro-sensor.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Embodiments of the present disclosure provide a device and technique for temperature detection and indication. According to one embodiment, a temperature indicator includes a micro-sensor having a sensing element with a first layer coupled to a second layer where the first and second layers having different coefficients of expansion. The sensing element is configured to move from a first position to a second position in response to exposure to a temperature event. The micro-sensor also includes detection circuitry configured to change from a first state to a second state in response to movement of the sensing element from the first position to the second position. The detection circuitry is prevented from returning to the first state in response to changing to the second state. The indicator also includes a radio-frequency identification (RFID) module coupled to the detection circuitry where the RFID module is configured to output a value indicating that the sensing element is in the second position. The indicator further includes an activator element configured to maintain the sensor element in the first position until removal of the activator element from the micro-sensor. Embodiments of the present disclosure enable temperature event detection using no internal power supply. The RFID module can detect the state of the switch circuitry and emit or output a value indicating the actuation status of the indicator. For example, in some embodiments, an RFID reader can be used to activate the RFID module and determine an actuation status of the temperature indicator device. Additionally, embodiments of the present invention utilize a micro-sensor (e.g., micro-mechanical and/or micro-electronic components) to detect temperature events having circuitry that results in the irreversibility of the actuation status of the indicator after detecting the temperature event. Further, embodiments of the present invention enable field-activation of the indicator (i.e., maintaining the indicator in a non-reactive state) so that temperature events detected prior to the intended application of the indicator do not unintentionally actuate the indicator.

During storage, transit, or use, many types of objects need to be monitored for temperature (i.e. cold chain) of the objects. For example, some types of objects such as food or pharmaceuticals may be susceptible to spoilage or lack of efficacy if they are subjected to temperatures that are too high for too long a time. The duration or threshold of the temperature excursion (i.e., "time-temperature" variable) is often more important than a non-duration focused or real time reading of temperature. Thus, for quality control purposes and/or the general monitoring of transportation/use conditions, it is desirable to determine and/or verify the temperature conditions to which the object has been exposed.

Figure 1:
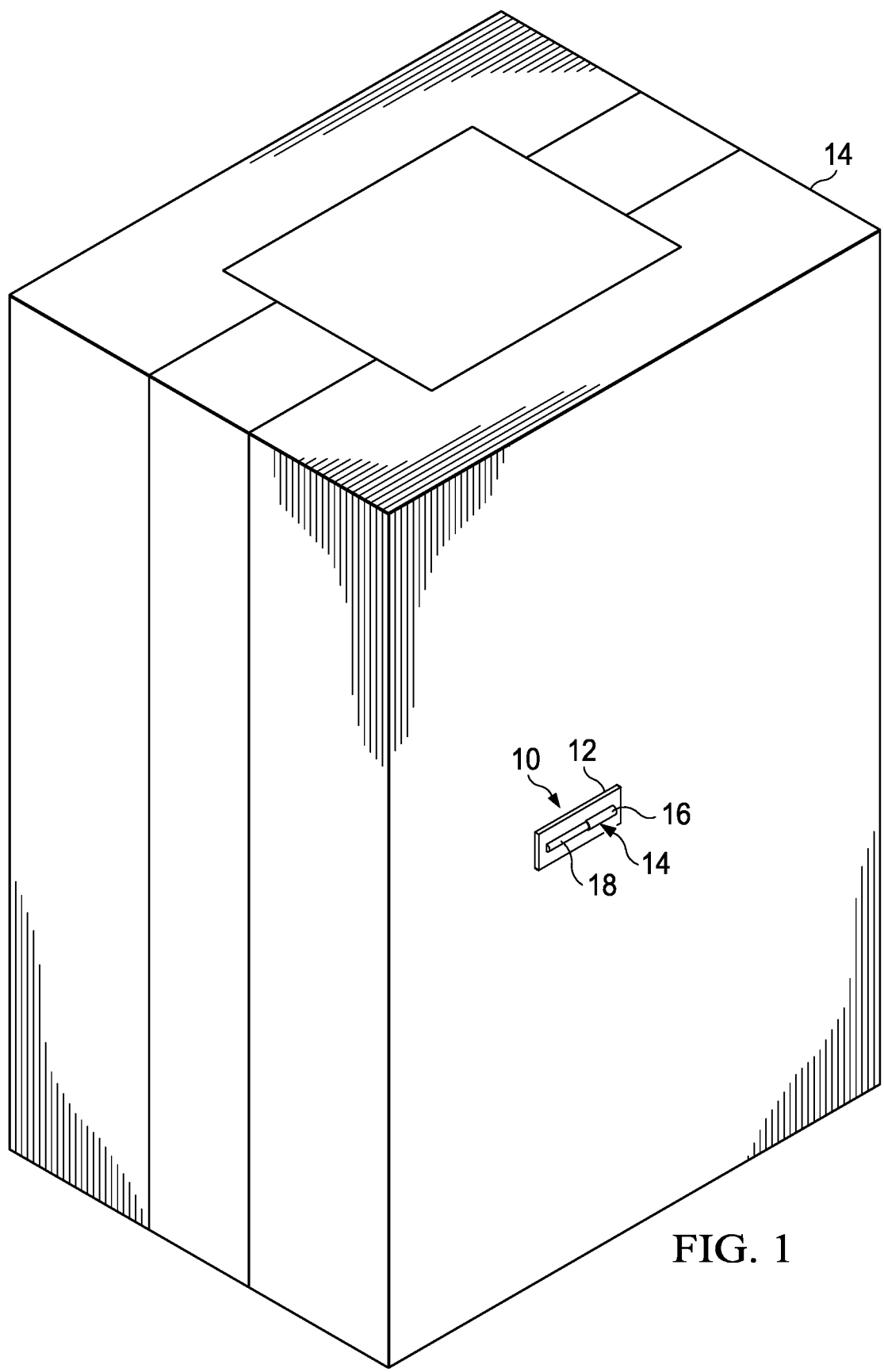
FIG. 1 is a diagram illustrating an application of an embodiment of a temperature indicator according to the present disclosure.

With reference now to the Figures and in particular with reference to FIG. 1, exemplary diagrams of a temperature indicator 10 are provided in which illustrative embodiments of the present disclosure may be implemented. FIG. 1 is a diagram illustrating a front view of temperature indicator 10. In FIG. 1, indicator 10 is a portable device configured to be affixed to or disposed within a transport container containing an object of which temperature events associated therewith are to be monitored. Embodiments of temperature indicator 10 monitor whether an object has been exposed to a particular temperature or environment during manufacturing, storage and/or transport of the object. In some embodiments, temperature indicator 10 may be affixed to a transport container using, for example, adhesive materials, permanent or temporary fasteners, or a variety of different types of attachment devices. The transport container may include a container in which a monitored object is loosely placed or may comprise a container of the monitored object itself. It should be appreciated that FIG. 1 is only exemplary and is not intended to assert or imply any limitation with regard to the environments in which different embodiments may be implemented.

In the embodiment illustrated in FIG. 1, temperature indicator 10 comprises a housing 12 having a temperature sensing, temperature-sensitive and/or temperature detection assembly 14 disposed therein. In the illustrated embodiment, detection assembly 14 is configured to detect and indicate temperature events relative to indicator 10 (e.g., detecting when indicator 10 (and correspondingly, a container to which indicator 10 is associated with) has been subjected to a particular environmental temperature). In some embodiments, housing 12 is configured and/or constructed from a clear or semi-opaque material having a masking label 16 located on a front side thereof or affixed thereto. In some embodiments, masking label 16 is configured having one or more apertures or "windows" 18 for providing a visual indication of temperature detection. For example, in some embodiments, in response to indicator 10 being subjected to a particular temperature, detection assembly 14 causes a visual indication to be displayed within or through one or more of windows 18 to provide a visual indication that the monitored object has or may have been subjected to some level of temperature. However, it should be understood that other methods may be used to provide a visual indication that detection assembly 14 has moved and/or been otherwise placed into an actuated state indicating that indicator 10 has experienced some level of temperature. It should also be understood that housing 12 may be configured and/or manufactured from other materials (e.g., opaque materials having one or more windows 18 formed therein). In some embodiments, housing 12 may be configured without window 18. For example, as will be described in greater detail below, indicator 10 may be configured to provide visual and/or non-visual indications of whether a temperature condition has been experienced by indicator 10 (e.g., via the use of RFID signals).

Figure 2:
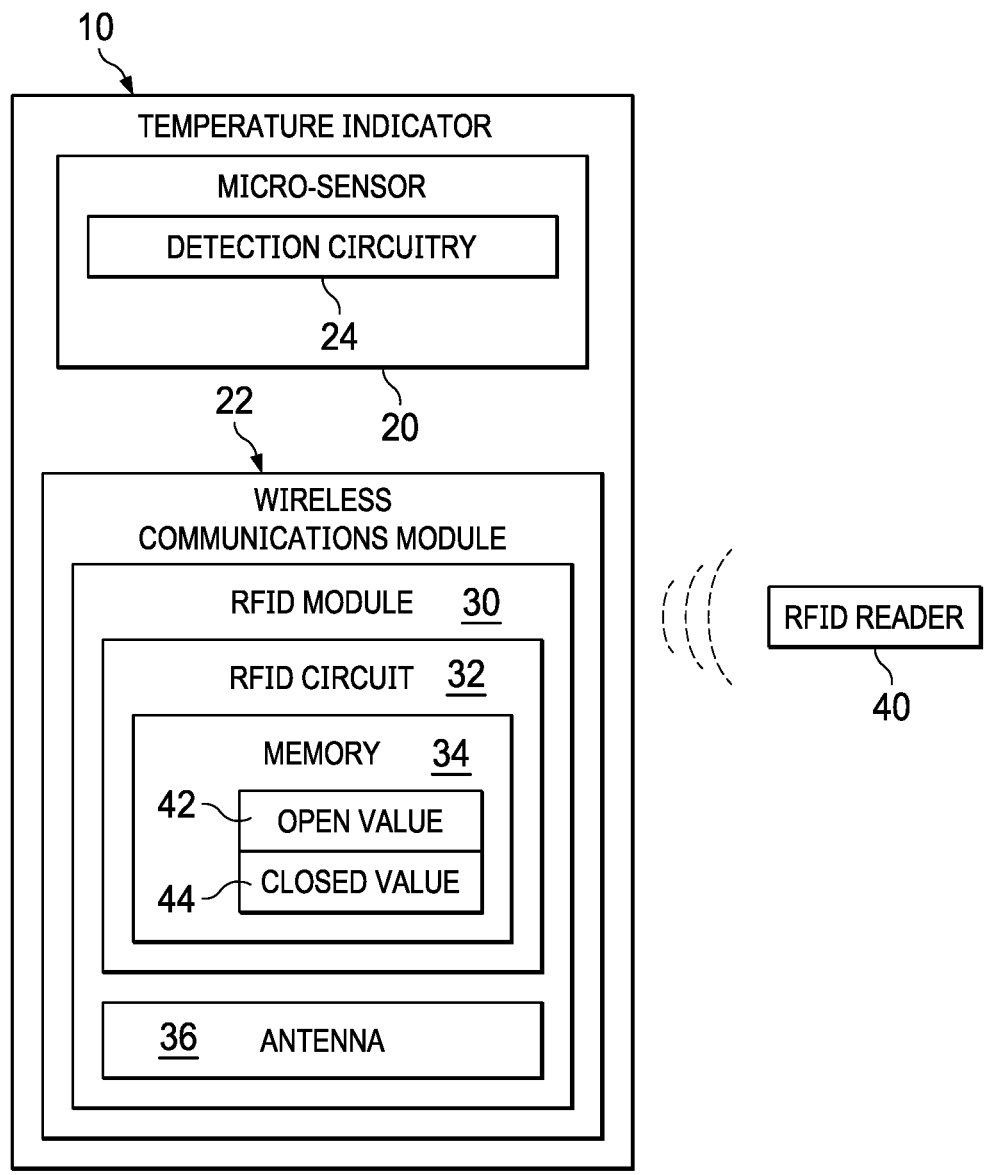
FIG. 2 is a is a block diagram illustrating an embodiment of a temperature indicator according to the present disclosure.

FIG. 2 is a block diagram representing and illustrating an embodiment of indicator 10 in accordance with an embodiment of the present disclosure. In FIG. 2, indicator 10 includes a micro-sensor 20 and a wireless communications module 22. Micro-sensor 20 is a micro-mechanical and/or micro-electronic device (e.g., a microscopic device or system (e.g., generally having micrometer-sized components with an overall size generally measured in square millimeters)) for detecting a temperature event (e.g., a temperature exceeding some threshold). Micro-sensor 20 may be configured as a microelectromechanical systems (MEMS) device (e.g., using silicon or other materials in the process or technique of deposition of material layers, patterning by photolithography, and etching to produce the required shape/components), a liquid crystal display (LCD) panel-fabricated device (e.g., a device manufactured using glass components and/or a glass substrate via LCD fabrication processes such as patterning, laminating, masking, cutting, and thin-film transistor (TFT) deposition techniques, which may or may not include liquid crystal), and/or be formed using roll-to-roll (R2R) processing techniques (e.g., creating the device on a roll of flexible plastic, metal foil, or flexible glass). In some embodiments, temperature indicator 10 may be affixed (permanently or removably) to a printed circuit board and/or otherwise permanently or removably connected to electronic circuitry (e.g., such as a removable cartridge) such that, in response to receipt and/or detection of a temperature condition of a sufficient magnitude and/or exceeding a particular threshold(s), temperature indicator 10 provides an electronic signal/indication of such event.

In some embodiments, micro-sensor 20 includes detection circuitry 24. Detection circuitry 24 may comprise one or more switch elements, traces, contacts, and/or circuits that are responsive to detecting a change in an actuation status of sensor 20. For example, in some embodiments, sensor 20 may include a movable element or member that moves or becomes displaced in response to being subjected to a temperature event. The displacement of the movable element may cause a state change in circuitry 24 (e.g., a change in impedance, changing from an open circuit condition to a closed circuit condition, or vice versa, etc.). Wireless communications module 22 is configured to wirelessly communicate information associated with a state of circuitry 24 indicating the actuation state of indicator 10 (e.g., based on an open or closed circuit state of circuitry 24). For example, in one embodiment, wireless communications module 22 includes an RFID module 30. In some embodiments, RFID module 30 comprises a passive RFID module 30 (e.g., a passive RFID tag) having an RFID integrated circuit or circuitry 32 (e.g., disposed on or as part of a printed circuit board) and a memory 34, along with an antenna 36. As a passive RFID module 30, indicator 10 does not contain a battery (e.g., power is supplied by an RFID reader 40), thereby forming a battery-free temperature indicator 10. For example, when radio waves from reader 40 are encountered by module 30, antenna 36 forms a magnetic field, thereby providing power to module 30 to energize circuit 32. Once energized/activated, module 30 may output/transmit information encoded in memory 34 (e.g., using communication protocols such as NFC, ISO-18000-3, ISO 18000-6, UHF Gen2, ISO-15693, etc.). However, it should be understood that, in some embodiments, RFID module 30 may comprise an active RFID module 30 including a power source (e.g., a battery) that may be configured to continuously, intermittently, and/or according to programmed or event triggers, broadcast or transmit certain information. One embodiment of a passive RFID tag is a flex circuit RFID in a roll form. In flex circuit RFIDs, the chip and antenna are embedded onto a thin substrate of 100 to 200 nm using, for example, polyvinyl chloride (PVC), polyethylenetherephtalate (PET), phenolics, polyesters, styrene, or paper via copper etching or hot stamping. One process for RFID manufacture is screen printing using conductive ink containing copper, nickel, or carbon. An example of a commercially available flex circuit passive RFID tag product that can come hundreds or even thousands in a roll is the Smartrac™ product from Avery Dennison Corporation.

It should also be understood that wireless communications module 22 may be configured for other types of wireless communication types, modes, protocols, and/or formats (e.g., short-message services (SMS), wireless data using General Packet Radio Service (GPRS)/3G/4G or through public internet via Wi-Fi, or locally with other radio-communication protocol standards such as Wi-Fi, Z-Wave, ZigBee, Bluetooth®, Bluetooth® low energy (BLE), LoRA, NB-IoT, SigFox, Digital Enhanced Cordless Telecommunications (DECT), or other prevalent technologies). As will be described further below, in response to receipt of a particular level and/or magnitude of a temperature event, temperature indicator 10 functions as a passive temperature sensor/indicator that can be used as part of an electronic signal or circuit. In some embodiments, the temperature sensing capabilities/functions of temperature indicator 10 of the present disclosure needs no power while in the monitoring state.

In the illustrated embodiment, memory 34 includes at least two different stored and/or encoded values 42 and 44. For example, value 42 may correspond to a value outputted/transmitted by module 30 when detection circuitry 24 is in an open circuit condition or state, and value 44 may correspond to a value outputted/transmitted by module 30 when detection circuitry 24 is in a closed circuit condition or state. As an example, the value 44 may represent an RFID tag identification (ID) number not having an activated temperature detection circuitry 24, and the RFID tag's ID number may have an additional character (e.g., "0") placed at the end thereof. Value 42 may represent the RFID ID number having an activated temperature detection circuitry 24, and the RFID tag's ID number may have an additional character at the end thereof being different from the additional character carried by value 44 (e.g., "1"). In the illustrated embodiment, RFID module 30 (e.g., circuitry 32) is coupled to detection circuitry 24 and can detect whether detection circuitry 24 is in an open or closed circuit condition or state. Thus, for example, detection circuitry 24 may initially be in closed circuit condition or state. Thus, if energized/activated, module 30 would transmit value 44 to reader 40. If indicator were to be subject to an temperature event, sensor 20 may cause a change in circuitry 24 that would result in circuitry 24 being in an open circuit condition or state. Thus, if now energized/activated (e.g., after the temperature event), module 30 would instead transmit value 42 to reader 40. Thus, embodiments of the present invention enable indicator 10 to monitor sensitive products/objects to which it is attached for potential damage caused by temperature variations using electronic indicators (e.g., RFID readers) while indicator 10 does not contain or require any internal power source (e.g., a battery). In some embodiments, detection circuitry 24 is configured to be irreversible such that once a change in state of the detection circuitry 24 occurs, the detection circuitry 24 is prevented from returning to a prior state. For example, if detection circuitry 24 is in a closed circuit state or condition prior to sensor 20 actuation, and an temperature event causes an actuation of sensor 20 that also causes detection circuitry 24 to transition to an open circuit state or condition, detection circuitry 20 is configured to be maintained in the open circuit state, thereby unable to return to the closed circuit state. Similarly, detection circuitry 24 may be configured to transition from an open circuit condition to a closed circuit in response to sensor 20 actuation and thereafter remain in the closed circuit condition without the ability to return to an open circuit condition. Thus, embodiments of the present invention prevent any unauthorized resetting of temperature indicator 10. It should also be understood that indicator 10 may be configured having a greater or lesser quantity of values stored in memory 34 (e.g., a single value emitted only upon activation of sensor 20; different values emitted corresponding to different temperature thresholds being exceeded; etc.).

The present invention may include computer program instructions at any possible technical detail level of integration (e.g., stored in a computer readable storage medium (or media) (e.g., memory 34) for causing a processor to carry out aspects of the present invention. Computer readable program instructions described herein can be downloaded to respective computing/processing devices (e.g., communications module 22 and/or RFID module 30). Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages. In some embodiments, electronic circuitry (e.g., circuitry 32) including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to illustrations and/or block diagrams of methods and/or apparatus according to embodiments of the invention. It will be understood that each block of the illustrations and/or block diagrams, and combinations of blocks in the illustrations and/or block diagrams, may represent a module, segment, or portion of code, can be implemented by computer readable program instructions. These computer readable program instructions may be provided to a processor or other programmable data processing apparatus to produce a machine, such that the instructions, which execute via the processor, create means for implementing the functions/acts specified in the illustrations and/or block diagram block or blocks. These computer readable program instructions may also be stored in a computer readable storage medium that can direct a computing device, a programmable data processing apparatus, and/or other devices to function in a particular manner, such that the computer readable storage medium having instructions stored therein comprises an article of manufacture including instructions which implement aspects of the function/act specified in the illustrations and/or block diagram block or blocks. Detection circuitry 24, wireless communications module 22, and/or RFID module 30 may be implemented in any suitable manner using known techniques that may be hardware-based, software-based, or some combination of both. For example, detection circuitry 24, wireless communications module 22, and/or RFID module 30 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system). As will be appreciated by one skilled in the art, aspects of the present disclosure may be embodied as a system, method or computer program product. Accordingly, aspects of the present disclosure may take the form of a hardware embodiment, a software embodiment (including firmware, resident software, micro-code, etc.) or an embodiment combining software and hardware aspects that may all generally be referred to herein as a "circuit," "module" or "system."

Figure 3:
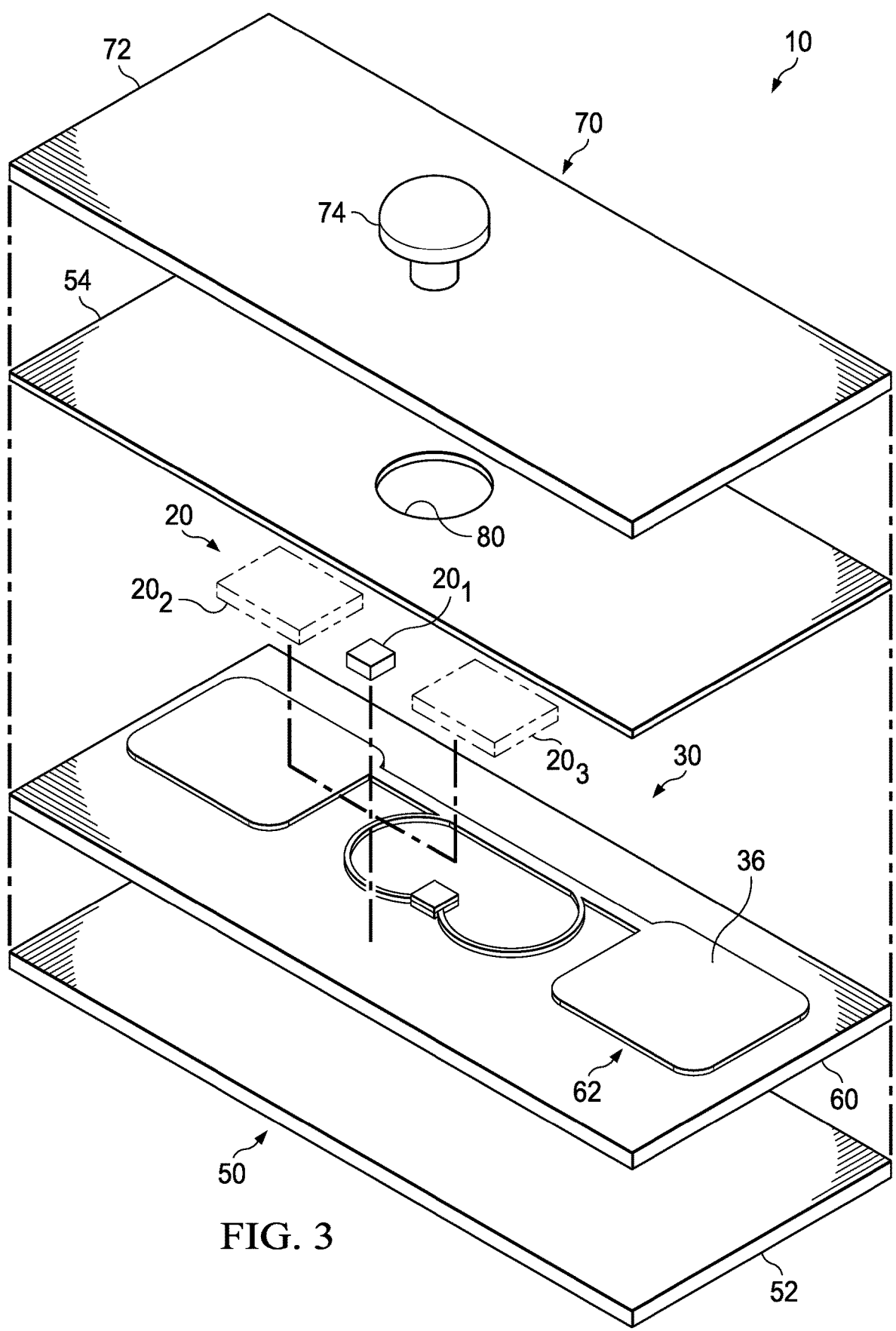
FIG. 3 is a diagram illustrating an exploded view of an embodiment of a temperature indicator according to the present disclosure.
Figure 4:
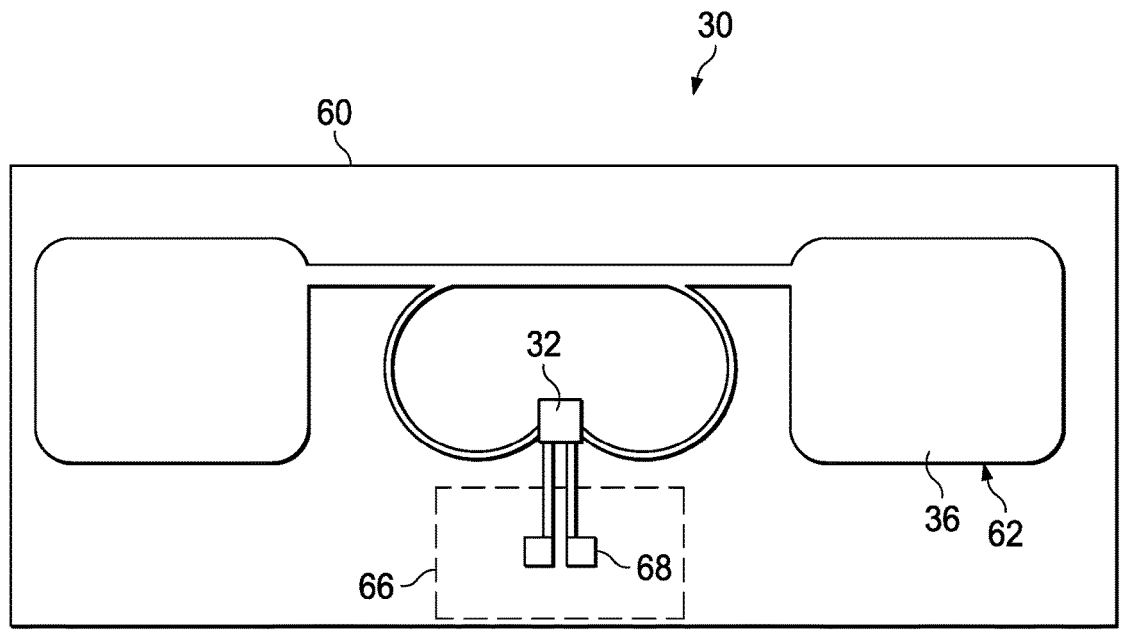
FIG. 4 is a diagram illustrating an enlarged view of a portion of the temperature indicator illustrated in FIG. 3 in accordance with the present disclosure.

FIG. 3 is a diagram illustrating an exploded view of various embodiments of the temperature indicator 10 according to the present disclosure, and FIG. 4 is a diagram illustrating an enlarged view of a portion of an embodiment of the temperature indicator 10 depicted in FIG. 3 according to the present disclosure. Referring to FIG. 3, indicator 10 includes a case or housing 50 having a bottom or lower wall 52 and a top or upper wall 54. Between the upper and lower walls 54 and 52, respectively, is RFID module 30. FIG. 4 illustrates an enlarged view of RFID module 30. In FIGS. 3 and 4, RFID module 30 includes a substrate 60 having an RFID inlay 62 forming antenna 36 along with the RFID chip or circuit 32 coupled thereto. In the illustrated embodiment, micro-sensor 20 is adhered and/or coupled to RFID module 30. For example, in the illustrated embodiment, sensor 20 may include a MEMS sensor $20_1$ or a LCD panel-fabricated sensor $20_2$ or a R2R-manufactured micro-sensor $20_3$. Referring to FIG. 4, RFID module 30 includes a mounting area 66 for receiving micro-sensor 20, and RFID module 30 also includes traces or leads 68 for communicatively and/or electrically coupling sensor 20 to RFID circuit 32.

Referring to FIG. 3, in the illustrated embodiment, indicator 10 includes an activator element 70. Activator element 70 is configured to maintain sensor 20 in a non-reactive state (i.e., unable to transition from an unactuated state to an actuated state where the unactuated state refers to a state of sensor 20 prior to receipt by the sensor 20 of a temperature event above a certain threshold and the actuated state refers to a state of sensor 20 after sensor has been subjected to a temperature event at or above the threshold) until removal of activator element 70 from indicator 10. For example, during shipment of indicator 10 to an end user (or otherwise), indicator 10 may be subjected to an temperature event that would be detected by sensor 20 and cause sensor 20 to be in an actuated state (i.e., indicating the receipt of a temperature event). Activator element 70 prevents sensor 20 from transitioning from an unactuated state to an actuated state even if a temperature event is experienced by sensor 20. Removal of activator element 70 from indicator 10 places sensor 20 in an active or sensing mode (i.e., capable of detecting an temperature event and transitioning to an actuated state to indicate the receipt of the temperature event).

For example, as will be described in greater detail below, in one embodiment, activator element 70 includes a retention element 72 that is adhesively adhered and/or otherwise coupled to upper wall 54 that includes an obstructer 74 that extends downward through an opening 80 formed in upper wall 54. Obstructer 74 may be in the form of a pin or other structural member that extends downward and engages at least a portion of sensor 20 to prevent sensor 20 from actuating. In operation, removal of retention element 72 from indicator 10 (e.g., peeling retention element 72 away from upper wall 54) also results in obstructer 74 being pulled outwardly from indicator 10, thereby disengaging from sensor 20 and enabling sensor 20 to be actuated in response to sensor 20 detecting an temperature event.

Figure 5:
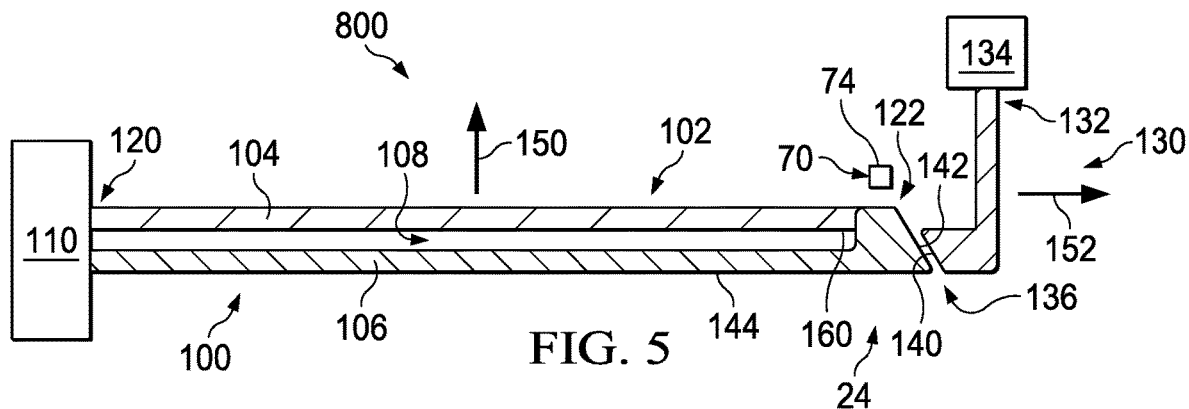
FIG. 5 is a diagram illustrating an embodiment of a micro-sensor of the temperature indicator of FIGS. 3 and 4 according to the present disclosure.
Figure 6:
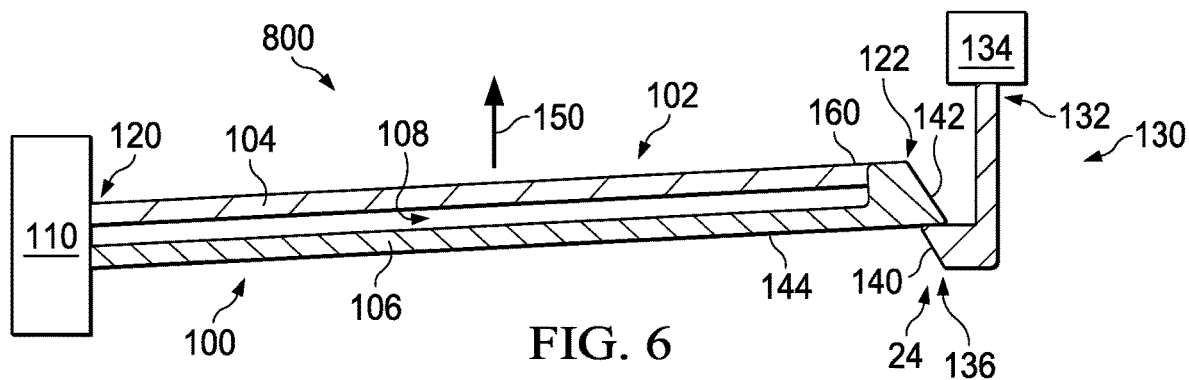
FIG. 6 is a diagram illustrating an embodiment of the temperature indicator of FIG. 5 in an actuated state in accordance with the present disclosure.

FIG. 5 is a diagram illustrating an embodiment of temperature indicator 10 incorporating a MEMS-type microsensor 20 according to the present disclosure in an unactuated and non-reactive state, and FIG. 6 is a diagram illustrating the embodiment of indicator 10 of FIG. 5 in an actuated state according to the present disclosure. Sensor 20 is representative of at least one of what could be any number of sensors 20 within an indicator 10 assembly (more than one sensor 20 may be necessary in a case where calibration of the sensors 20 is necessary).

In the illustrated embodiment, sensor 20 includes a sensing element 100 configured to move in response to being exposed to a temperature event (e.g., moving from a first position or location as depicted in FIG. 5 to a second position or location such as depicted in FIG. 6). Sensing element 100 may comprise a plurality of layers of materials with at least two of the layers having different temperature-sensitive properties. For example, in the illustrated embodiment, sensing element 100 includes a cantilever structure 102 having layers or beams 104 and 106. Beams 104 and 106 are formed so that one of the beams 104 or 106 contains at least one material that is dissimilar from at least one material within the other beam 106 or 104. In the illustrated embodiment, beams 104 and 106 are disposed side-by-side or adjacent each other, parallel (or substantially parallel), and spaced apart from each other for at least some distance so as to define a gap 108 therebetween along their lengths. In this embodiment, cantilever 102 is formed as a planar structure. Cantilever 102 may lie in a different plane than the underlying structure of sensor 20 (e.g., the substrate 60 (FIG. 3)). Cantilevered structure 102 is represented as comprising beams in the illustrated embodiment; however, it should be understood that sensor 20 may encompass other cantilevered or non-cantilevered structures, including flat structures such as diaphragms. The term "bimorphic" is commonly used to refer to such a bending effect in a single beam formed by two active layers, and this term will be used herein to more generally refer to a bending effect that a combination of dissimilar materials will cause in a cantilevered structure in response to exposure to a parameter of interest. In particular, the dissimilar materials are selected to have mismatched expansion/contraction (elongation/shrinkage) responses to a parameter of interest, resulting in the cantilevered structure bending toward the beam that shrinks more or does not elongate as much as the other beam. If the parameter is at a sufficiently high (threshold) level, the deflection of the cantilevered structure is sufficient to open or close (depending on the operating mode of the sensing device) an electrical contact associated therewith, which can serve to interrupt or allow, respectively, the transfer of a charge or electrical current, generation of an electrical voltage, or provide another form of output capable of corresponding to a digital signal. Contact between the cantilevered structure and an electrical contact is referred to herein as a contact-mode switching function or contact mode operation, and in some embodiments non-latching (i.e., other than as a result of its bending or deflection, the cantilevered structure is not mechanically latched or otherwise secured to the contact).

In a preferred embodiment, the property change in the sensing element 100 responsive to the parameter is temporary and reversible. For example, if the sensing element 100 responds to temperature (thermal expansion or contraction), the resulting response (deflection) of the cantilevered structure 102 is temporary and the cantilever 102 will return to its original configuration after the temperature excursion is over unless it is mechanically restricted from doing so (e.g., by latching the bent cantilever or otherwise restricting movement of the cantilever 102 from returning to its original position/form).

In the illustrated embodiment, sensor 20 includes a support member 110 affixed to cantilever 102 (or integrally formed as a part of cantilever 102). In some embodiments support member 110 is fabricated as a feature on a conventional CMOS circuit substrate in which the sensor 20 may also be fabricated. As illustrated in FIGS. 5 and 6, an end 120 of cantilever 102 proximate to support member 110 is coupled to or formed as part of support member 110 while an opposite, distal end 122 of cantilever 102 is suspended and/or freestanding relative to any adjacent substrate or structure, thereby enabling end 122 to move relative to fixed end 120. In the illustrated embodiment, end 122 is located proximate to a latch or latching pawl 130. For example, latch 130 has an end 132 coupled to or formed as part of a support member 134. An opposite, distal end 136 of latch 130 is suspended and/or freestanding and disposed adjacent to, but not in contact with, end 122 of cantilever 102 when cantilever 102 is in the unactuated or non-reactive state (FIG. 1). In the illustrated embodiment, a face 140 of end 136 faces a face 142 of end 122 of cantilever 102. Faces 140 and 142 are configured parallel to each other and spaced apart from each other in the unactuated or non-reactive state (FIG. 5). Faces 140 and 142 are angled such that at least a portion of face 140 extends over at least a portion of face 142 (e.g., face 142 formed at an acute angle relative to a surface 144 of beam 106 and face 140 formed at a supplementary angle toward cantilever 102 relative to surface 144). Latch 130 is configured as a flexible latch 130 such that movement of cantilever 102 in the direction indicated by arrow 150 causes face 142 to contact face 140 and cause movement of latch 130 away from cantilever 102 in the direction indicated by arrow 152, thereby enabling cantilever 102 to move past end 136 of latch 130 in response to a temperature event.

As illustrated in FIG. 5, sensor 20 includes activator element 70 so that during manufacturing, storage, and/and shipment of indicator 10 (e.g., prior to indicator 10 being placed on an item of temperature monitoring interest), cantilever 102 does not move a sufficient distance in direction 150 so that a latching occurs with latch 130 even if sensor 20 has been exposed to a temperature event. As illustrated in FIG. 5, activator element 70 includes obstructer 74 disposed proximate cantilever 102 to thereby limit movement of cantilever 102 in the direction 150 in the event sensor 20 experiences a temperature event. It should be understood that obstructer 74 may be otherwise located and/or positioned proximate cantilever 102 to thereby limit and/or prevent movement of cantilever 102 to the point where sensor 20 would be in an actuated position or state.

Sensor 20 and its cantilevered structure 102 may be fabricated directly on an integrated circuit substrate (e.g., CMOS wafer) in which other electronic devices of indicator 10 can also be formed (e.g., RFID circuit 32, antenna 36, etc.). An alternative is to fabricate sensor 20 and its cantilevered structure 102 on a separate substrate that is subsequently electrically coupled or bonded to a different substrate. It can be readily appreciated that the cantilevered structure 102 of the sensor 20 is compatible with post-CMOS processing and can be fabricated in a very small areas even if there are multiple cantilevers 102 in sensor 20. It should also be understood that structures other than cantilevered beams could be employed that are capable of responding to an environmental parameter of interest by closing and/or opening electrical contacts.

In the illustrated embodiment, the dissimilar materials of the beams 104 and 106 are chosen to cause the cantilevered structure 102 to bend or deflect in direction 150 (FIG. 5) in response to an environmental parameter of interest (e.g., beams 104 and 106 each comprising a material having a different coefficient of expansion related to temperature). As shown in FIGS. 5 and 6, distal end 122 of beam 106 bridges gap 108 to connect to a distal end 160 of beam 104. As noted above, the individual responses of the cantilevered structure 102 to an environmental parameter of interest may be referred to as bimorphic in the following discussion, though it should be understood that a strictly bimorphic cantilevered structure 102 is not required (e.g., the cantilevered structure 102 does not necessarily require two active beams 104 and 106; instead, structure 102 may have a single active beam or more than two active beams). The sensor 20 can be configured to sense a wide variety of different environmental parameters to which RFID module or tag 30 might be subjected (e.g., temperature, moisture/humidity, electromagnetic radiation, nuclear particle radiation, chemicals, biological agents, etc.). Such capabilities can be achieved by using appropriate materials to form the cantilevered structure 102 of the sensing element 100, as will be understood from the following discussion.

As previously noted, the dissimilar materials of beams 104 and 106 are selected to have mismatched expansion/contraction (elongation/shrinkage) responses to a parameter of interest, resulting in the cantilevered structure 102 bending in the direction 150 as beam 106 either elongates more than beam 104 or doesn't shrink as much beam 104 under certain environmental conditions (e.g. a threshold temperature or time-temperature parameter). Due to the side-by-side arrangement of the beams 104 and 106 and their attachment at their distal ends 160 and 122, respectively, the deflection of the cantilevered structure 102 is in a direction within a plane in which the cantilevered structure 102 and its beams 104 and 106 lie. The gap 108 is defined by and between the beams 104 and 106 is depicted as being uniform in its width along the lengths of the beams 104 and 106 as a result of the beams 104 and 106 being side-by-side and parallel. The presence of the gap 108 results in the beams 104 and 106 not being in direct contact with each other along most to their lengths with only distal end 122 of beam 106 bridging gap 108 and being attached to distal end 160 of beam 104. Therefore, the active length portions of the beams 104 and 106 that produce the bimorphic effect do not directly contact or interact with each other.

According to some embodiments of the present disclosure, sensor 20 is a MEMS device that functions as a switch (i.e., having detection circuitry 24) in response to one or more environmental parameters of the environment surrounding indicator 10. For example, in some embodiments, detection circuitry 24 may be formed as part of (or directly on) cantilever 102. For example, in some embodiments, beam 106 (and its distal end 122) and latching pawl 130 are electrically conductive so that when they contact each other they function as a switch. In this embodiment, support members 110 and 134 are also at least partially conductive in order to act as contacts for detection circuitry 24. In some embodiments, cantilever 102 and/or latching pawl 130 may have an outer layer of a conductive material and/or a deposited conductive trace that also enables cantilever 102 and latching pawl 130 to function as a switch.

As described above, FIG. 5 depicts indicator 10 in a non-reactive and unactuated state (i.e., before it has been field armed (e.g., by removing activator element 70). In an example where indicator 10 is being used as a temperature sensor, if a temperature event or condition causes beam 106 to expand more than beam 104, this expansion would ordinarily cause cantilever 102 to move in direction 150. However, prior to the removal of activator element 70, activator element 70 prevents and/or limits movement of cantilever 102 in the direction 150 to thereby prevent cantilever from engaging latching pawl 130. Thus, prior to the removal of activator element 70, indicator 10 can experience a temperature event that would otherwise cause the actuation or activation of sensor 20 without triggering indicator 10.

After the removal of activator element 70, indicator 10 is in a reactive state (i.e., capable of being actuated in response to experiencing a temperature event). For example, in this embodiment, in response to being subjected to a temperature event, cantilever 102 moves in the direction 150 as depicted in FIG. 6. In this embodiment, latching pawl 130 is configured such that a force applied by cantilever 102 to latching pawl (e.g., face 142 contacting face 140) resulting from movement of cantilever 102 in the direction 150 causes latching pawl 130 to move in the direction 152, thereby enabling cantilever 102 to move past end 136 of latching pawl 130. After cantilever 102 has moved past end 136 of latching pawl 130, latching pawl 130 returns to its original location/position (e.g., moving in a direction opposite direction 152) as depicted in FIG. 6. Accordingly, once latching pawl 130 returns to its original location/position, latching pawl 130 prevents cantilever 102 from returning to its original or non-reactive state position, thereby resulting in an irreversible actuation of indicator 10.

Figure 7:
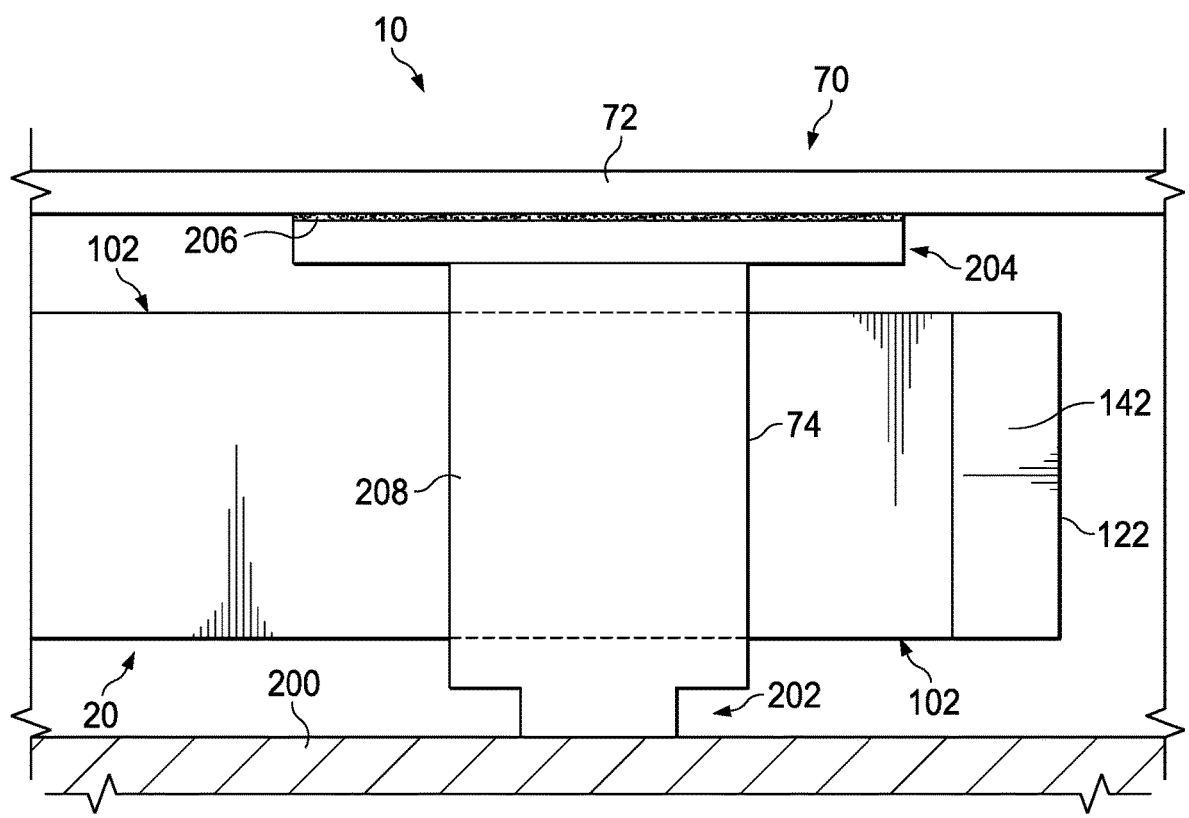
FIG. 7 is a diagram illustrating an enlarged view of a portion of the temperature indicator illustrated in FIGS. 5 and 6 in accordance with the present disclosure.

FIG. 7 is a diagram illustrating an embodiment of activator element 70 in accordance with the present disclosure. In the illustrated embodiment, obstructer 74 is anchored and/or coupled to a substrate 200 of sensor 20. For example, in some embodiments, because of the micro-scale of cantilever 102 and the desired small footprint of the overall indicator 10, obstructer 74 is also formed on a micro-scale and manufactured using the same MEMS manufacturing techniques used to form sensor 20. In FIG. 7, a portion of cantilever 102 is depicted adjacent obstructer 74. Various elements associated with activator element 70 are not depicted in FIGS. 5 and 6 for ease of illustration and description of the operation of sensor 20 in connection with FIGS. 5 and 6. In FIG. 7, obstructer 74 is configured to be detached from substrate 200 at its proximal end 202 relative to substrate 200. For example, since cantilever 102 is movable in response to being subjected to a temperature event, if the temperature event would otherwise result in movement of cantilever 102 to an actuated state, cantilever 102 will first come into contact with obstructer 74, thereby limiting the amount of movement of cantilever 102 and preventing an amount of movement of cantilever 102 that would otherwise cause cantilever 102 to engage pawl 130 (FIGS. 5 and 6). Accordingly, obstructer 74 is attached to substrate 200 near end 122 of cantilever 102 with sufficient strength to withstand the momentum of cantilever 102 due to the potential movement of cantilever 102 because of experiencing an temperature event.

In the embodiment illustrated in FIG. 7, obstructer 74 includes an enlarged distal end 204 (distal to proximal end 202) attached to retention element 72 using an adhesive layer 206, and an intermediate portion 208 extending between ends 202 and 204. Since micro-sensor 20 is on a micro-scale, distal end 204 is configured having sufficient surface area that adhesive layer 206 remains attached to distal end 204 such that when retention element 72 is removed or pulled away from sensor 20, retention element 72 pulls on enlarged distal end 204 and, in turn, results in a force applied to proximal end 202 of obstructer 74 in a direction away from substrate 200 to cause obstructer 74 to disengage from substrate 200. In the illustrated embodiment, proximal end 202 is configured having a lesser cross-section area than distal end 204, resulting in less surface area of proximal end 202 attached to substrate 200 to enable obstructer 74 to disengage from substrate 200 upon removal of retention element 72 from indicator 10. In some embodiments, proximal end 202 may be formed of a more frangible material than the other parts of obstructer 74 to facilitate the separation of proximal end 202 from substrate 200 in response to removal of retention element 72. In one embodiment, obstructer 74 may be undercut at proximal end 202 to weaken the attachment of obstructer 74 to substrate 200 at proximal end 202.

In addition, cantilevered structure 102 could include additional layers/films, such as stress compensation layers to improve the distribution of any processing-induced strain within the cantilevered structure 102. It is also within the scope of the invention to fabricate either or both beams 104 and 106 of the cantilevered structure 102 to comprise layers that can be patterned for the purpose of modifying the beams 104 and 106, including their responses to the environmental parameter being sensed, such as temperature, humidity, chemicals, electromagnetic and particle radiations, UV light, and/or other environmental conditions. In addition, as discussed above, beam 106 might have an outer layer of a conductive material so that is can be used as a switch when contacting a conductor on latching paw 130.

Thus, embodiments of the present disclosure enable temperature and/or temperature event detection using a temperature indicator having a small footprint using a mechanical sensing element 100 with a passive RFID tag that gives a different reading depending upon the status of the temperature switch circuitry. Because the RFID tag is passive, the temperature indicator does not need a battery or other external power source. Further, the configuration of the temperature indicator enables the temperature indicator to be irreversible once actuated (or subjected to a sufficient magnitude of temperature event). Additionally, the temperature indicator of the present disclosure may be configured with a single or multiple indication mechanisms (e.g., an LCD panel-fabricated sensor 20 may include a liquid that may be visible within a certain area of the indicator 10 upon actuation). Further, a variety of fabrication processes may be used for indicator 10 (e.g., any fabrication process that realizes one or more micromechanical structural layers with 1) conducting elements that can make electrical contact, and 2) a movable sensing element responsive to temperature variations). Examples include bulk micromachining and wafer-bonding fabrication approaches in silicon, silicon dioxide, ceramic, nickel, titanium and other conductors, as well as LIGA-type fabrication processes (i.e., lithography, electroplating and moulding) using electroplated metals, and additive fabrication methods such as ink-jet dispense, paste screening, and other deposition methods using liquids which then become solidified.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A temperature indicator, comprising:
    a micro-sensor having:
        a cantilevered sensing element coupled to a support member, the sensing element having a first layer and a second layer, the first and second layers defining a gap therebetween along at least a portion of their respective lengths, and wherein a first distal end of the first layer with respect to the support member is coupled to a second distal end of the second layer with respect to the support member, the first and second layers having different coefficients of expansion, the first and second distal ends of the sensing element configured to move from a first position to a second position in response to exposure to a temperature event;
        detection circuitry configured to change from a first state to a second state in response to movement of the sensing element from the first position to the second position, the detection circuitry prevented from returning to the first state in response to changing to the second state; and
        a latching element movable in a first direction in response to contact by the sensing element moving from the first position to the second position;
    a radio-frequency identification (RFID) module coupled to the detection circuitry, wherein the RFID module is configured to output a value indicating that the sensing element is in the second position; and
    an activator element configured to maintain the sensing element in the first position until removal of the activator element from the micro-sensor.

2. The temperature indicator of claim 1, wherein the latching element is configured to prevent the sensing element from returning to the first position after moving to the second position.

3. The temperature indicator of claim 1, wherein the micro-sensor is formed on a wafer substrate.

4. The temperature indicator of claim 1, wherein the micro-sensor is formed on a liquid crystal display (LCD) panel substrate.

5. The temperature indicator of claim 1, wherein the micro-sensor is formed on a roll-to-roll (R2R) substrate.

6. The temperature indicator of claim 1, wherein the activator element includes:
    a portion disposed proximate the sensing element; and
    an end configured to receive a force applied thereto to displace the portion from being located proximate the sensing element.

* * * * *